May 26, 1970     J. C. McKEOWN     3,514,052
CONTROL SYSTEM FOR AIRCRAFT HAVING LATERALLY OFFSET ROTORS
Filed Jan. 25, 1968     10 Sheets-Sheet 1
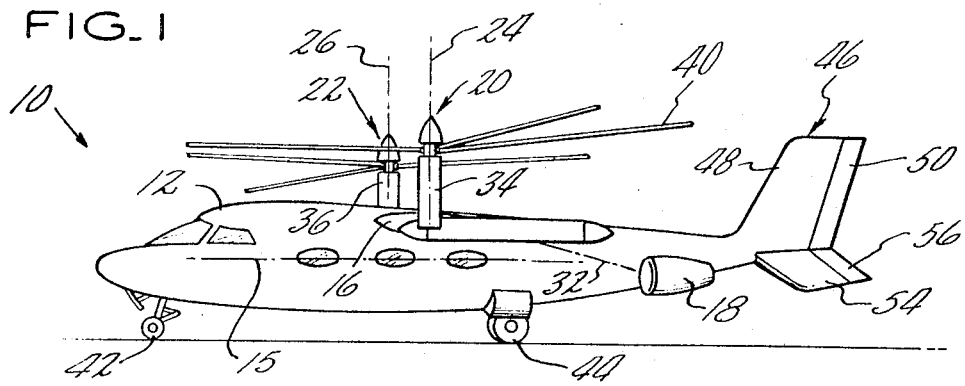
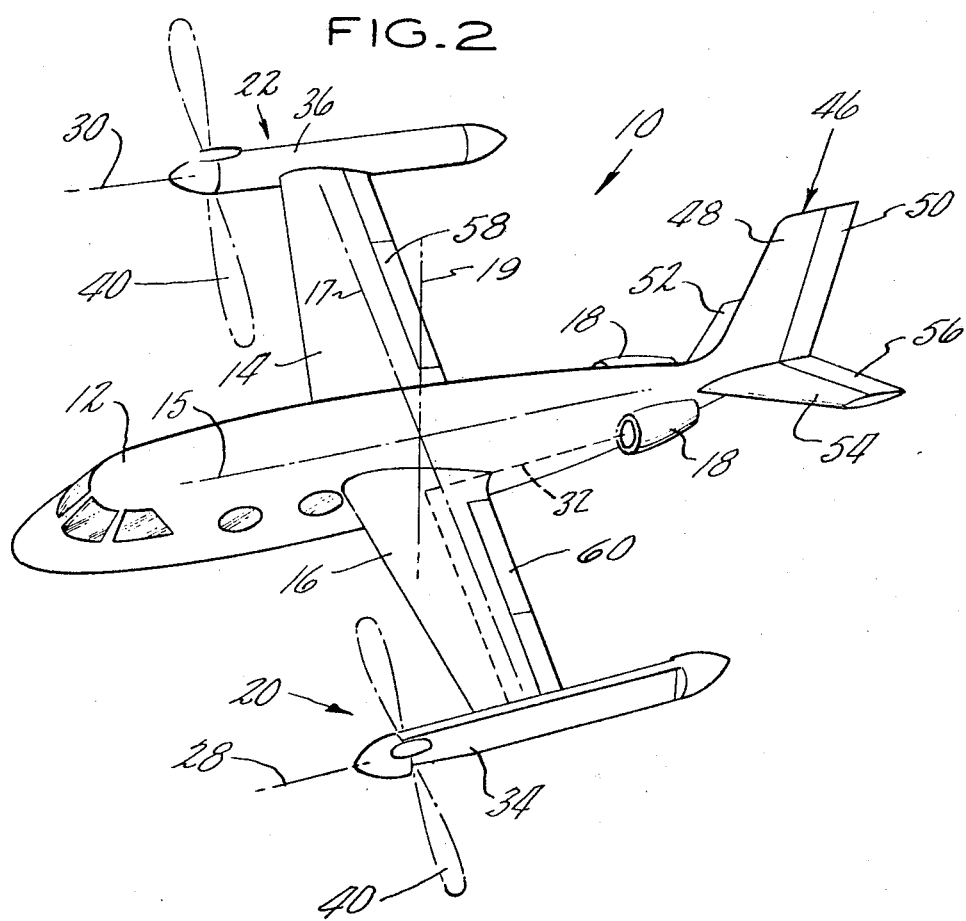
INVENTOR
JOHN C. McKEOWN
BY Vernon F. Hauschild
ATTORNEY

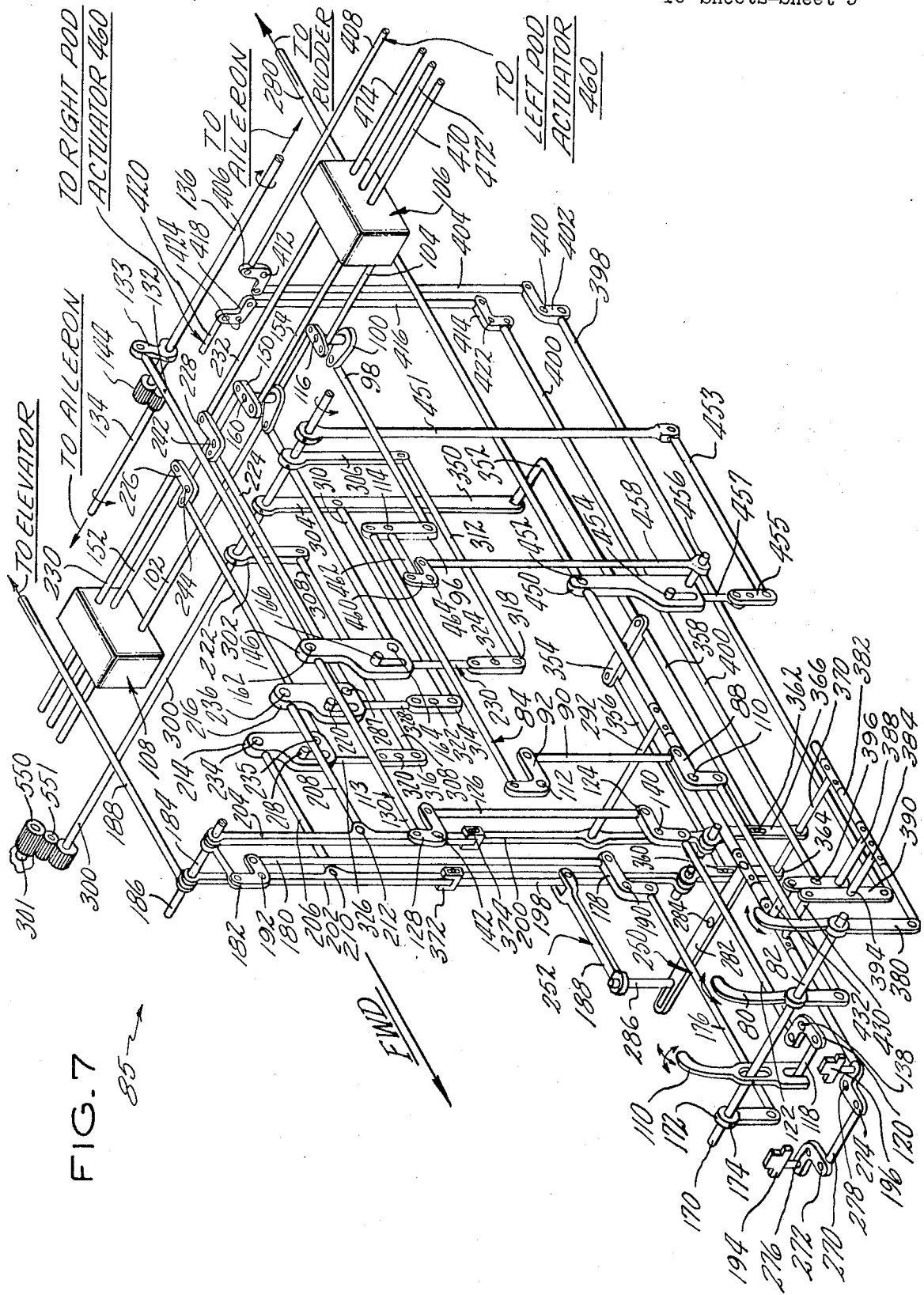

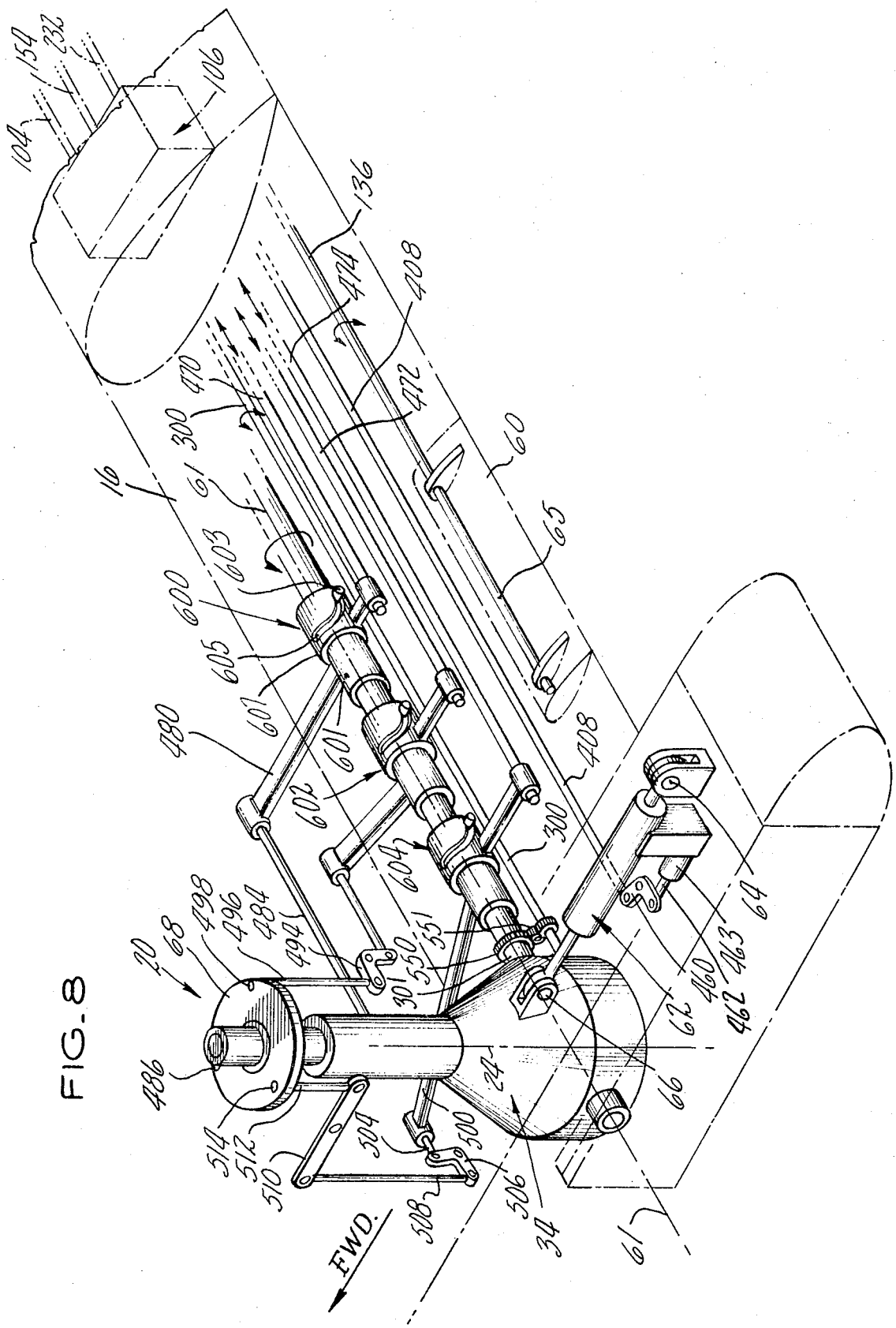

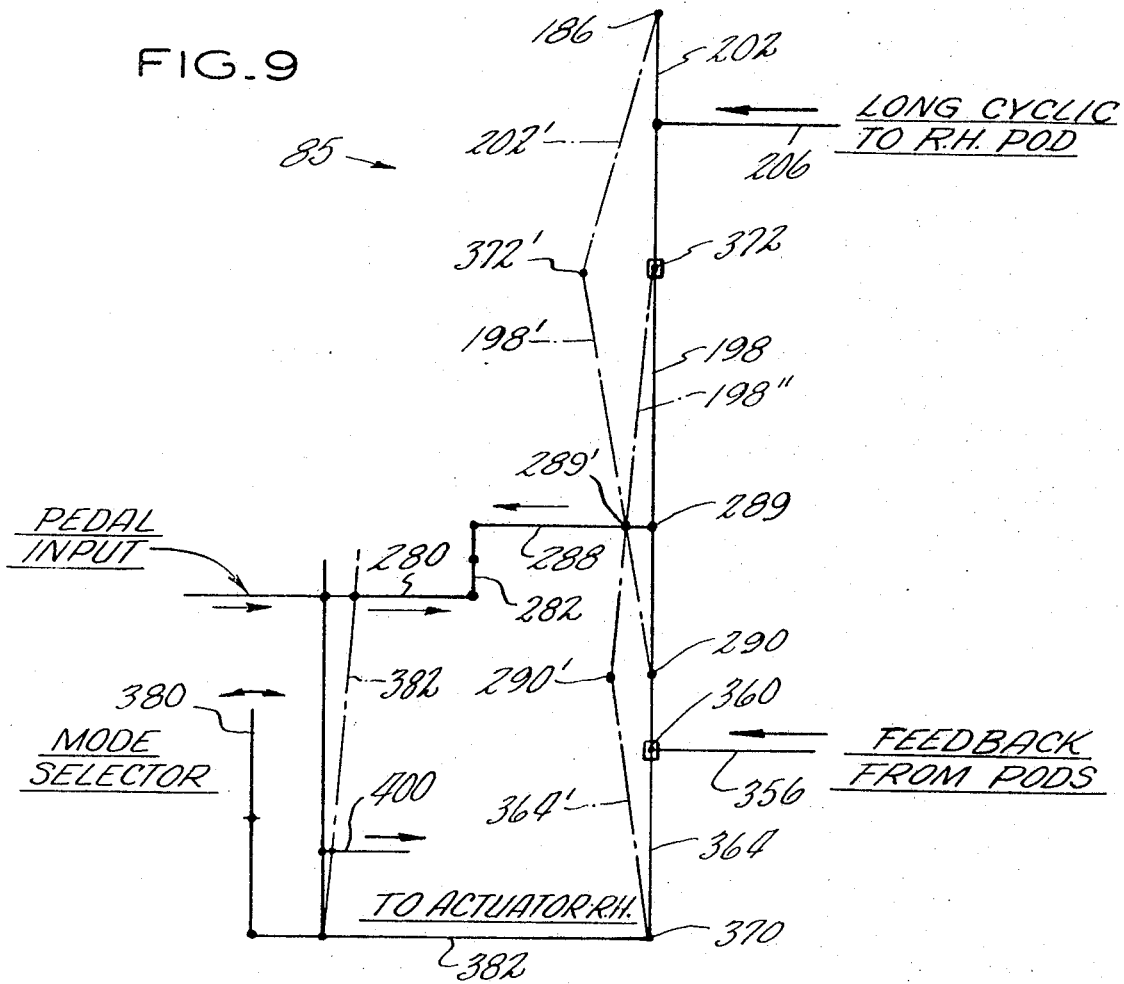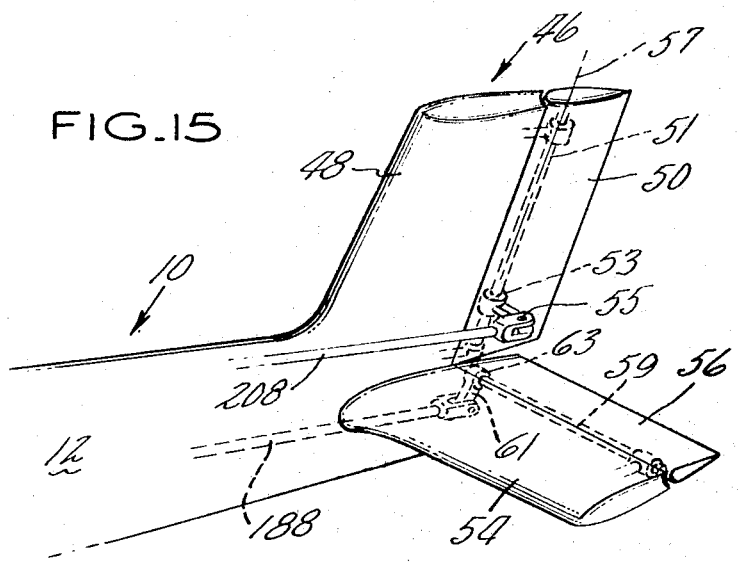

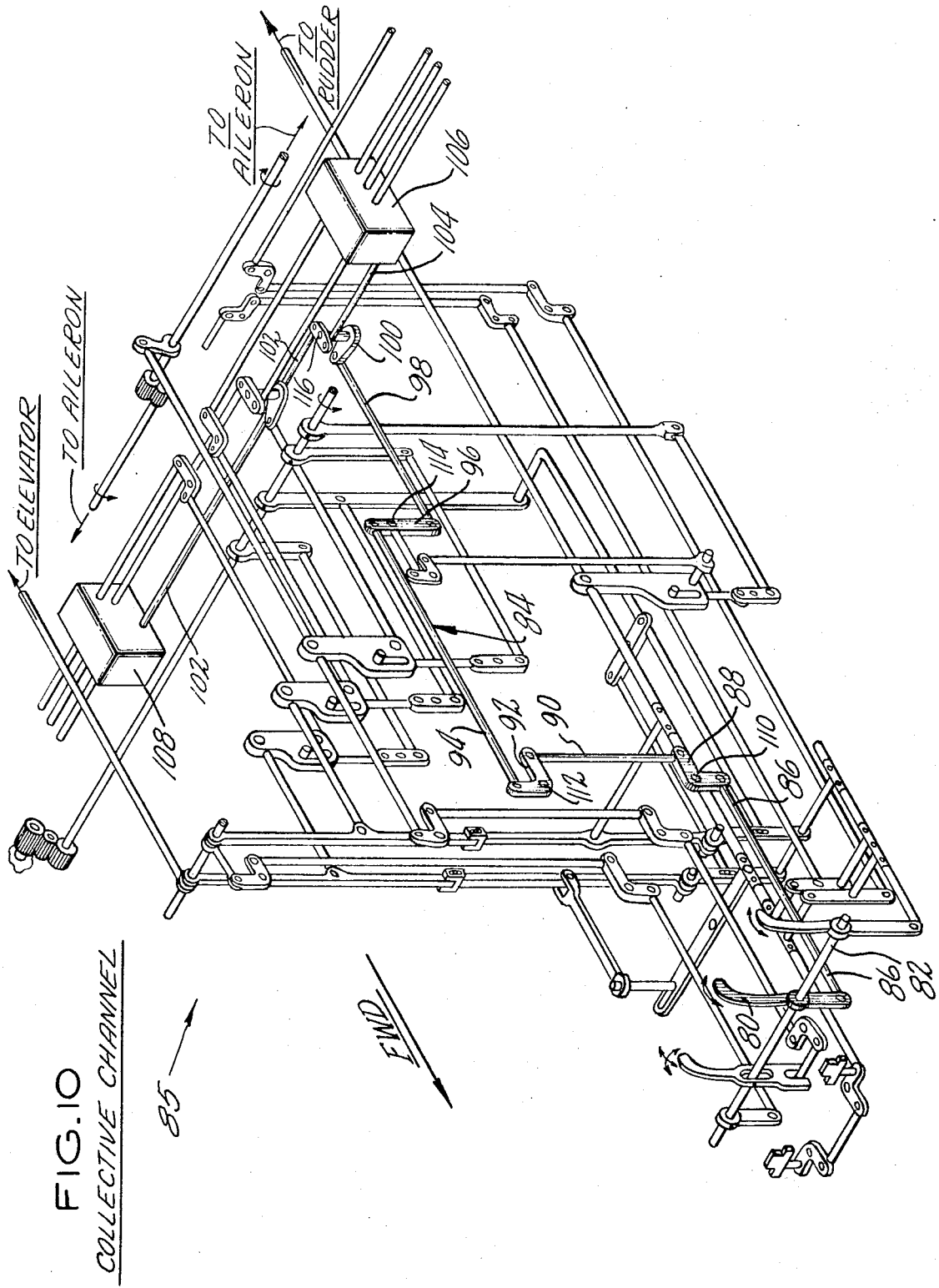

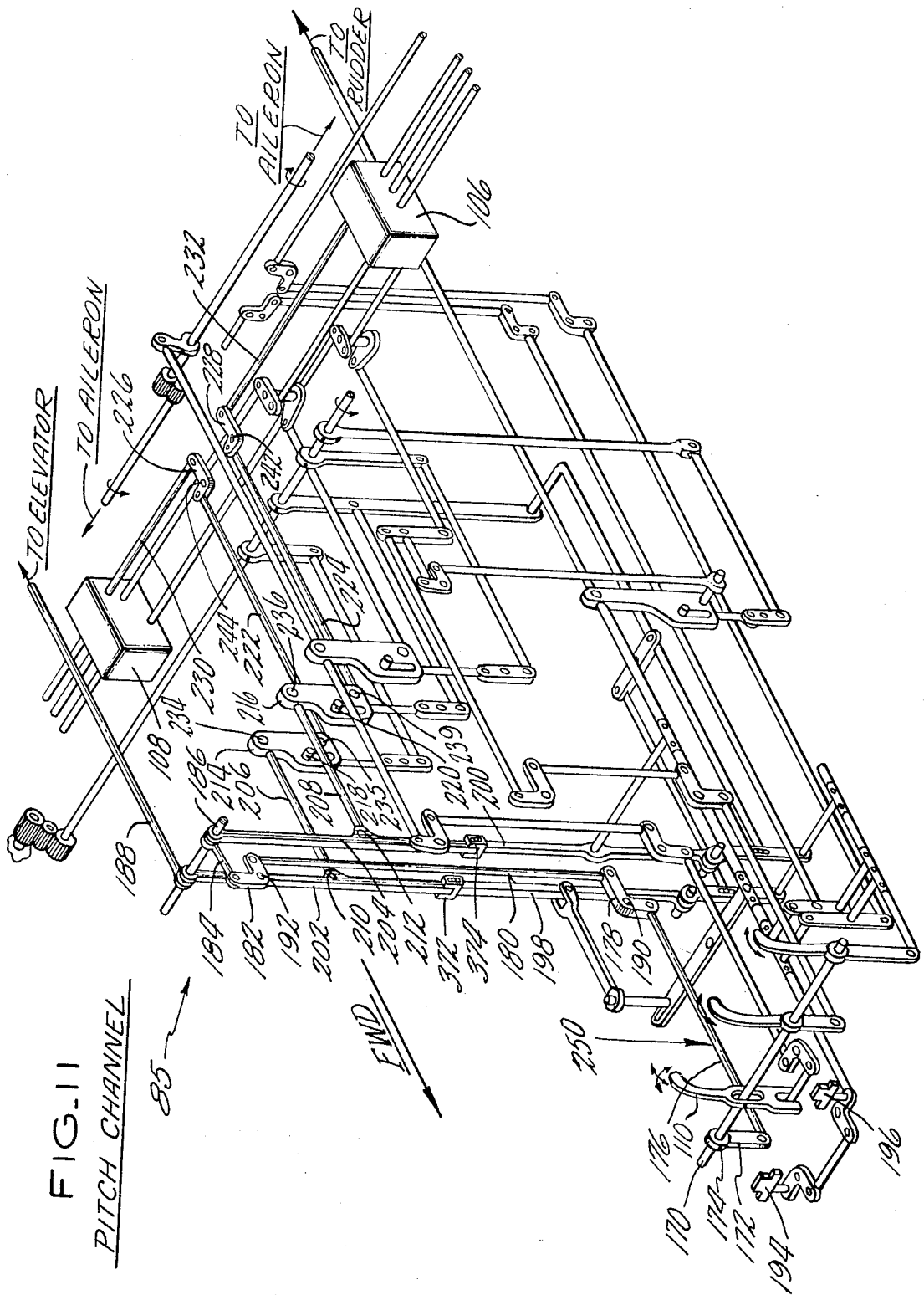

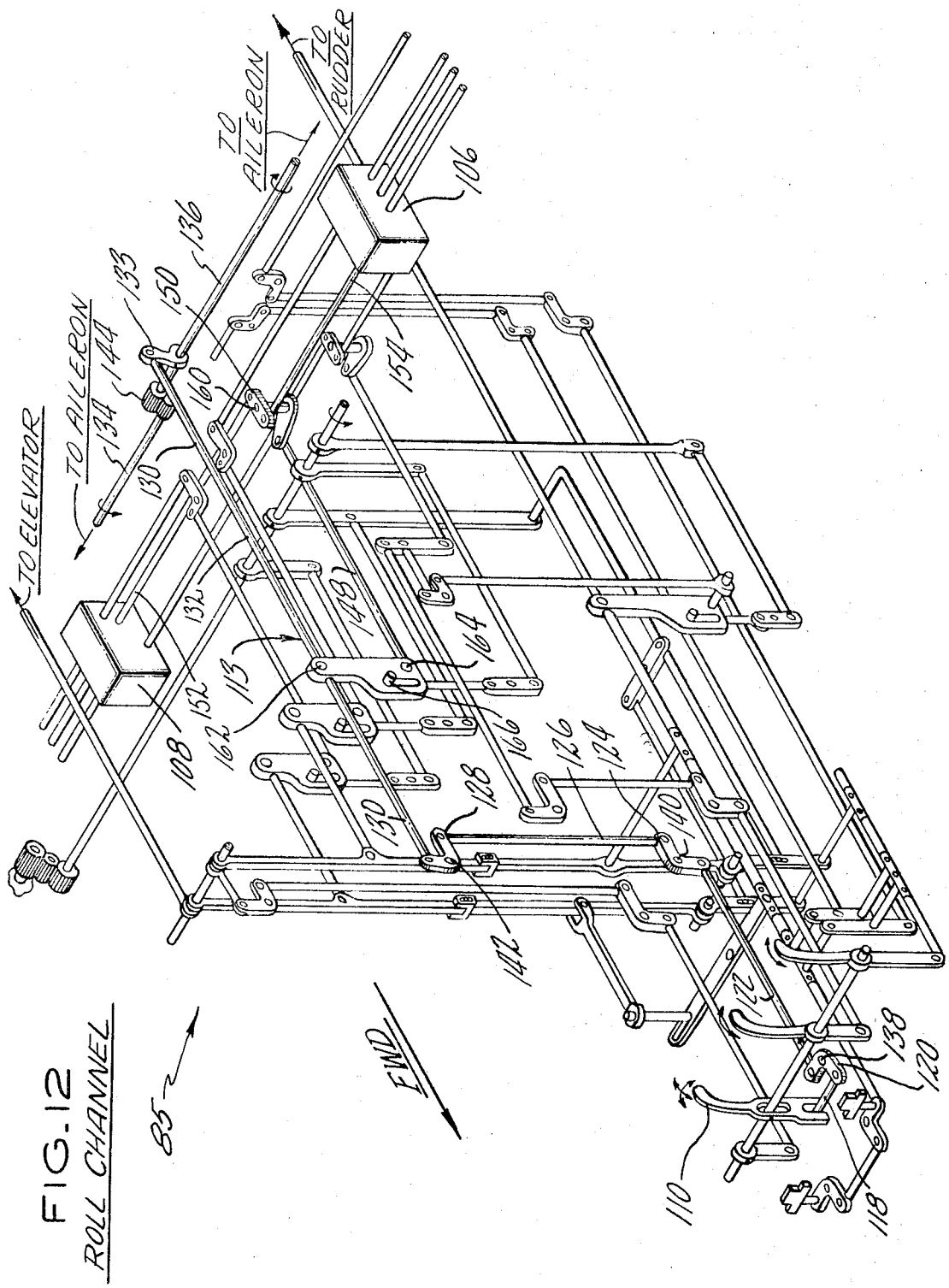

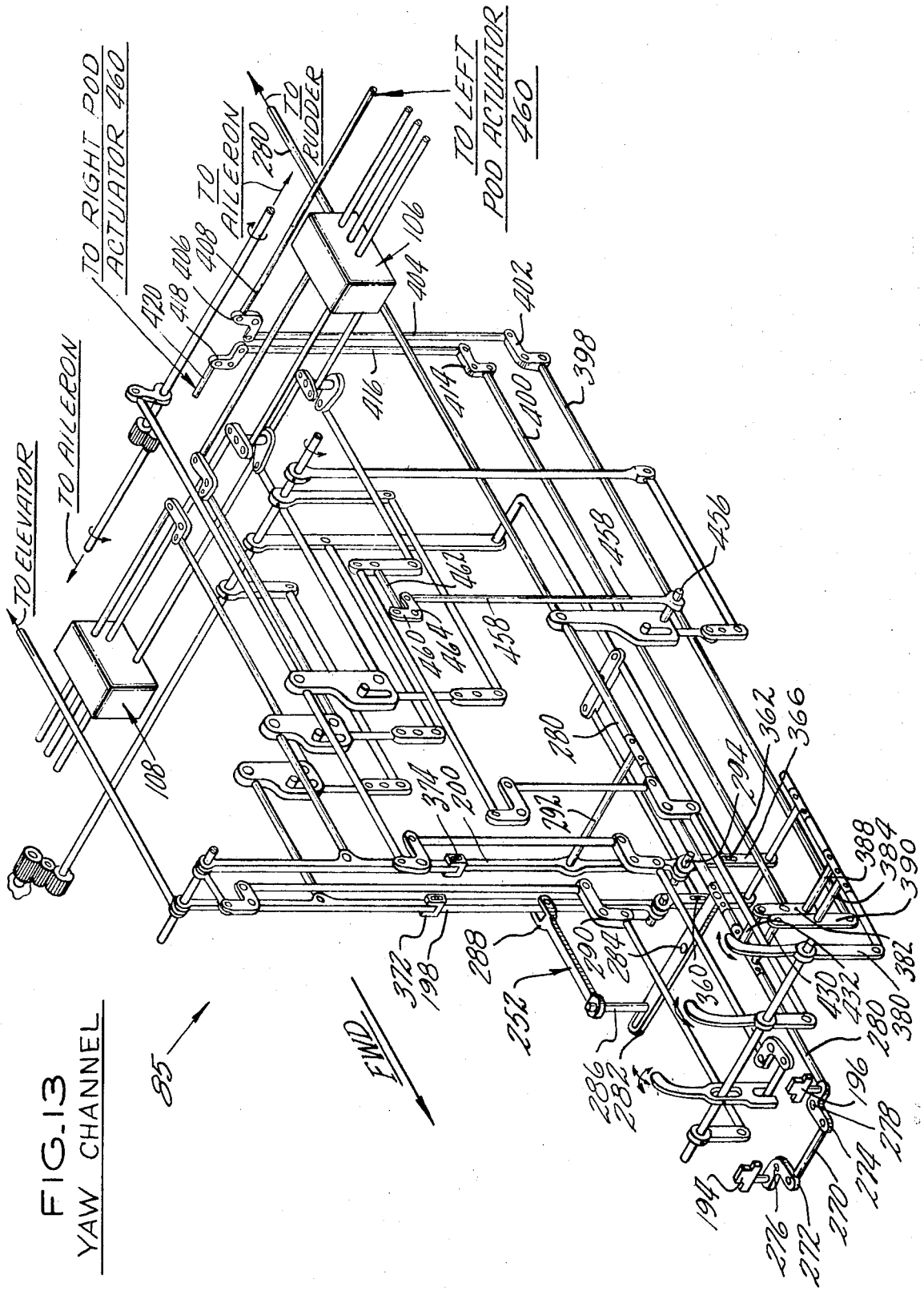

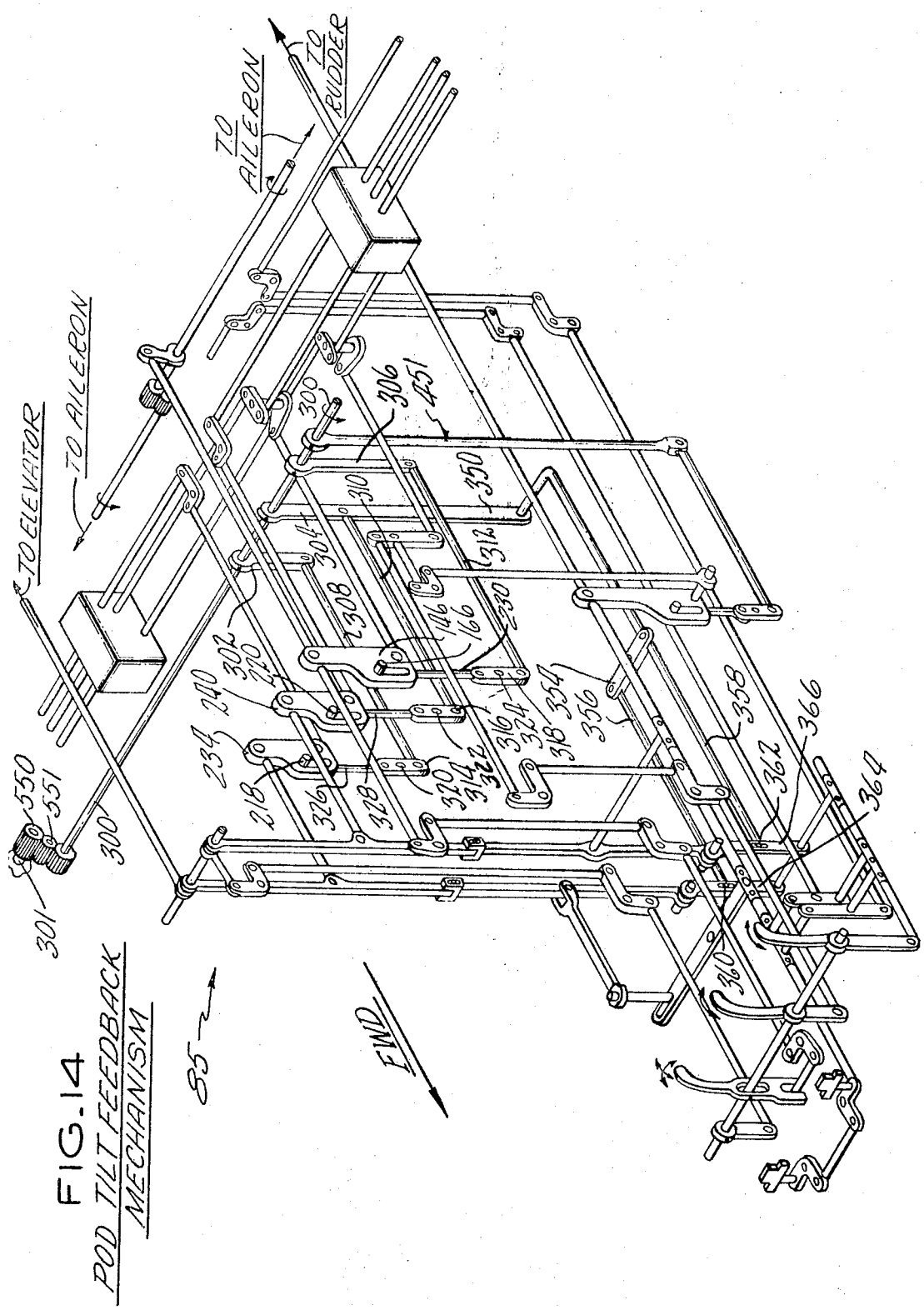

United States Patent Office 3,514,052
Patented May 26, 1970

3,514,052
CONTROL SYSTEM FOR AIRCRAFT HAVING
LATERALLY OFFSET ROTORS
John C. McKeown, Wilkes-Barre, Pa., assignor to United
Aircraft Corporation, East Hartford, Conn., a corporation of Delaware
Filed Jan. 25, 1968, Ser. No. 700,545
Int. Cl. B64c 27/28
U.S. Cl. 244—7    21 Claims

ABSTRACT OF THE DISCLOSURE

A control system for an aircraft having laterally offset rotors which are tiltable between vertical positions for helicopter mode of operation and horizontal positions for propeller mode of operation and which has roll, pitch and yaw control in both modes of operation with the yaw control in the helicopter mode constituting tilting the rotor pods in opposite directions while applying differential longitudinal cyclic pitch to the rotors and washing out the cyclic pitch in response to increased pod tilting.

---

The invention herein described was made in the course of or under a contract or subcontract thereunder with the Department of the Air Force.

BACKGROUND OF THE INVENTION

This invention relates to compound aircraft which are capable of operating in the helicopter mode, the propeller mode and possibly even in the jet or fixed-wing mode and which aircraft include laterally displaced pod-mounted rotors and more particularly to mechanism accomplishing the yaw, roll and pitch control thereof.

In the aircraft art, fixed-wing aircraft commonly employ tail rudders for yaw control. Since such means require substantial forward velocity to be effective, single rotor helicopters have commonly employed as their means for yaw control tail rotors or controllable gas exhaust nozzles as shown in U.S. Pat. Nos. 3,256,780 and 3,222,012, respectively. Tandem rotor helicopters have used differential cyclic pitch to tilt the thrust vectors and produce the desired yawing moment, whereas composite aircraft as shown in U.S. Pat No. 2,835,456 have used variations of differential collective pitch.

For an aircraft having laterally offset rotors supported in tiltable pods, three basic types of yaw control are possible: differential collective pitch, differential cyclic pitch, and differential pod tilting. Differential collective pitch increases the pitch of one rotor and decreases that of the other producing a differential torque and hence an available yawing moment, but has inherent roll-to-yaw coupling. Differential cyclic pitch tilts the swash plates longitudinally and hence the thrust vectors of the rotors in opposite directions to produce the yawing moment and, although its quick response is an advantage, the high flapping of the blades for extended periods of time imposes heavy loads upon the blades, possibly producing aircraft vibration problems and reducing blade life. Finally, differential pod tilting tilts the thrust vectors longitudinally in different directions and, although it eliminates the problems associated with high blade flapping, has inherent problems of an inertial nature, specifically, relatively slow response and difficulty in stopping a large moving mass. This last method of yaw control has been shown to be particularly impractical when it was realized that pod angular rates of about 50° per second were required to meet standard handling qualities specifications.

It is the object of the yaw control system disclosed herein to combine the second and third alternatives, namely, differential cyclic pitch and differential pod tilting in such a manner that the combination exhibits the advantages and eliminates the disadvantages of each.

SUMMARY OF INVENTION

A primary object of the present invention is to provide flight control for an aircraft having laterally offset rotors including yaw control provisions in the helicopter mode which include differential longitudinal cyclic pitch of the rotors and power tilting of the rotor supporting pods in the opposite longitudinal directions and with provision for washing out, dissipating or otherwise removing the cyclic pitch in response to pod tilt increase.

In accordance with the present invention, the laterally offset rotors are provided with both collective and cyclic pitch control and the pitch control mechanism functions to reduce cyclic pitch authority as the pod mounted rotors move from their vertical helicopter mode positions to their horizontal propeller mode positions so that there is no cyclic pitch in the propeller mode of operation. We accordingly have cyclic phase-out in the propeller mode.

In accordance with a further aspect of the present invention, the blade pitch controls are designed and fabricated so that as the pod is tilted from its vertical helicopter mode to its horizontal propeller mode, the collective pitch level is increased for the same collective stick positions, while the collective pitch range remains the same. We accordingly have collective biasing.

In accordance with still a further aspect of the present invention, as yaw control is called for in the helicopter mode and the vertical thrust vector of the laterally displaced rotors is diminished due to rotor thrust tilting, caused by either cyclic pitch or power pod tilting, collective pitch on each rotor is automatically increased to compensate for the reduction in the vertical thrust component caused by the aforementioned thrust vector tilting. We accordingly have collective compensation during yaw control.

The invention permits flight control of a compound aircraft which is capable of helicopter and propeller modes of operation, and possible jet-mode of operation, wherein, in the helicopter mode of operation, pitch control is accomplished by an application of longitudinal cyclic pitch of the laterally offset rotors in the same direction, roll control is accomplished by lateral cyclic pitch of the offset rotors in the same direction, and yaw control is accomplished by a combination of differential longitudinal cyclic pitch and power tilting the pods in opposite longitudinal directions, with cyclic pitch being washed out in response to increased pod tilting. Further, in this flight control system, during propeller or jet-mode of operation, pitch control is accomplished by the use of elevators, roll control is accomplished by the use of ailerons, and yaw control is accomplished by the use of a tail rudder, and, further, wherein the propeller and fixed-wing pitch, roll and yaw controls are used in conjunction with identical cockpit controls of the helicopter mode to produce cooperative effect therebetween.

It is an object of this invention to use differential longitudinal cyclic pitch between the two laterally offset helicopter rotors to produce an acceptably fast and immediate response to a yaw control input and to couple this cyclic pitch with power tilting of the pods in opposite longitudinal directions, and with the cyclic pitch being washed out in response to pod tilting increase so that eventually pod tilt alone is providing the yaw control.

In accordance with another aspect of this invention, yaw control in the helicopter mode is accomplished by a combination of differential longitudinal cyclic pitch and pod tilting and wherein the amount of flapping of the rotor blades in cyclic pitch is about ±15° and which flapping is washed out in response to pod tilt increase.

In accordance with another aspect of this invention, pod tilting can take place without introducing inadvertent pitch change. We accordingly have pod tilt-pitch change decoupling.

BRIEF DESCRIPTION OF THE DRAWINGS

FIG. 1 is a showing of a convertiplane in the helicopter mode of operation which will be controlled in pitch, roll and yaw by the subject matter of this invention.

FIG. 2 is a showing of the convertiplane of FIG. 1 in the propeller mode of operation.

FIG. 7 shows the integrated pitch, yaw roll and collective channels of the flight control system which is the subject matter of this invention and which controls the convertiplane for both the helicopter (shown) and propeller modes of operation and has the specific yaw control illustrated in FIGS. 3–5 integrated thereinto.

FIG. 8 is a schematic showing of a typical wing tip mounted tiltable pod rotor illustrating the control inputs from FIG. 7 and also illustrating the power actuator for pod tilting.

FIG. 9 is a schematic showing of a portion of the FIG. 7 flight control system to illustrate cyclic pitch wash-out in response to pod tilting.

FIG. 10 corresponds to FIG. 7 but with the collective channel of the flight control system emphasized.

FIG. 11 corresponds to FIG. 7 but with the pitch channel of the flight control system emphasized.

FIG. 12 corresponds to FIG. 11 but with the roll channel of the flight control system emphasized.

FIG. 13 corresponds to FIG. 7 but with the yaw channel of the flight control system emphasized.

FIG. 14 corresponds to FIG. 7 but with the pod tilt feedback portion of the flight control system emphasized.

FIG. 15 shows the connection of the flight control system of FIG. 7 to the aircraft tail rudder and elevators.

Referring to FIGS. 1 and 2 we see convertiplane or compound aircraft 10 which is capable of helicopter mode of operation as shown in FIG. 1, propeller mode of operation as shown in FIG. 2, and which may also be capable of jet-mode of operation when the helicopter blades 40 of rotors or propellers 20 and 22, which may be either of the articulated rotor or rigid rotor type, are folded back against pods 34 and 36, at which time jet engines 18 power the aircraft. It will be noted that aircraft 10 includes fuselage 12 and has fixed-wings 14 and 16 projecting on laterally opposite sides thereof. Jet engines 18, which may be of the type shown in U.S. Pats. Nos. 2,711,631 and 2,747,367 may be fixed to aircraft 10 on wings 14 or 16 or any convenient place on fuselage 12 as shown. Aircraft 10 has a longitudinal axis 15, a lateral axis 17 and a vertical axis 19. Rotors 20 and 22 serve to power aircraft 10 in both the FIG. 1 helicopter mode of operation and the FIG. 2 propeller mode of operation. While elements 20 and 22 are referred to herein as rotors, it will be obvious to those skilled in the art that they could as well have been called propellers. These rotors are suspended from tiltable power pods 34 and 36 to be rotatable about axes of rotation 24 and 26 when in their pure helicopter mode of operation and about axes 28 and 30 when in their pure propeller mode of operation. Rotors 20 and 22, each of which consists of a number of blades 40 are driven by engines 18 through a conventional mechanical connection (not shown) but indicated generally at 32. Power pods 34 and 36 are tiltable between their FIG. 1 vertical positions and their FIG. 2 horizontal positions as the convertiplane 10 changes from the helicopter mode to the propeller mode of operation. Aircraft 10 is supported from the ground by landing gear 42 and 44.

Figure 3:
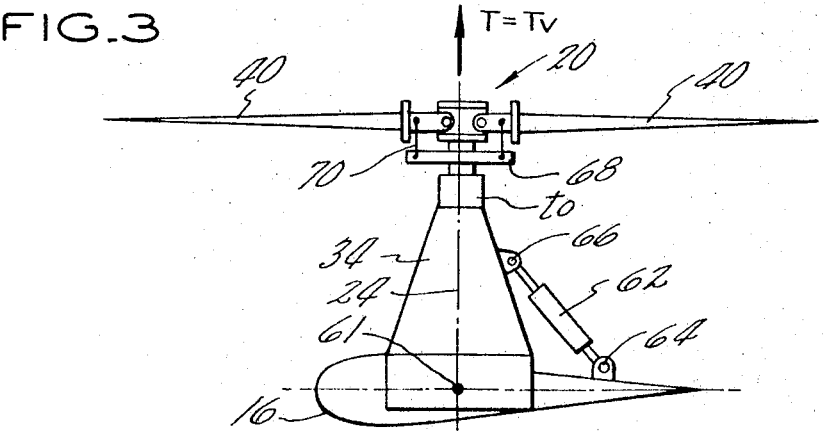
FIG. 3 is a schematic showing of a side view of one of our two tiltable pod-type rotors shown in the helicopter mode without yaw, cyclic pitch or pod tilt inputs so that it is in a steady state helicopter mode condition.

Aircraft 10 also includes the tail section 46, which has vertical stabilizer section 48, with rudder 50 pivotally extending therefrom in conventional fashion, and also includes laterally projecting horizontal stabilizer sections 52 and 54, each of which has an elevator pivotally attached thereto, one of which is shown at 56. Ailerons 58 and 60 are pivotally connected to wings 14 and 16 for roll control.

During fixed-wing mode of operation, wherein tilt pods 34 and 36 are in their FIG. 2 position and blades 40 of rotors 22 and 20 are folded back thereagainst and engines 18 serve to power aircraft 10 in jet engine fashion, and also during the propeller mode of operation shown in FIG. 2, aircraft 10 is controlled in pitch by elevators 56, in roll by ailerons 58 and 60 and in yaw by rudder 50. During these modes of operation, for a rightward or starboard yaw motion, rudder 50 is caused to move in a counterclockwise direction when viewed from above and is caused to move in a clockwise direction with respect to vertical tail support 48 for a left or port yaw motion. For an upward pitch motion, elevators 56 are caused to pivot upwardly with respect to lateral tail portions 52 and 56, and a downward pivoting motion of elevators 56 would cause a downward pitch motion. A right or starboard roll would be accomplished by pivoting aileron 58 upwardly with respect to fixed-wing 14 and pivoting aileron 60 downwardly with respect to fixed-wing 16. A leftward or port roll would be accomplished by opposite motions of ailerons 58 and 60. These same pitch, roll and yaw functions are performed by rudder 50, elevators 56 and ailerons 58 and 60 during the FIG. 1 helicopter mode of operation also in cooperation with the helicopter mode controls to be described hereinafter but they become ineffective at very low flight speeds and during the hover operation.

To accomplish aircraft control during the helicopter mode of operation, the blades 40 of rotors 20 and 22 are mounted so as to be capable of collective and cyclic pitch variation and power pods 34 and 36 are powered to be tiltable not only the 90° of arc between the FIG. 1 and FIG. 2 positions but also for small degree motions longitudinally on opposite sides of their FIG. 1 vertical positions wherein the rotors are rotating about axes 24 and 26. For a more particular description of the construction of rotors 20 and 22, and their coaction with blades 40 so as to accomplish the desired collective and cyclic pitch variation, reference may be had to U.S. Pats. Nos.

3,199,601 and 3,256,780, which are hereby incorporated by reference.

Aircraft 10 is controlled in the helicopter mode to accomplish pitch variation by applying longitudinal cyclic pitch to rotors 20 and 22 in the same direction so as to tilt the rotor thrust vectors either forwardly together or rearwardly together with respect to axes 24 and 26 of FIG. 1. Roll control is accomplished in the helicopter mode of operation by applying lateral cyclic pitch to rotors 20 and 22 so as to cause the rotor thrust vectors to move in the same direction laterally on either side of axes 24 and 26. For yaw control in the helicopter mode, longitudinal cyclic pitch is applied to rotors 20 and 22 in the opposite directions so as to produce differential longitudinal cyclic pitch therebetween and power pods 34 and 36 are powered in opposite directions to tilt longitudinally with respect to axes 24 and 26 and, as stated above and described in greater particularity hereinafter, the cyclic pitch of the rotors is washed out during yaw control as the tilt of the power pods increases. If yaw control to the right is desired, the thrust vector of rotor 20 is tilted forward by the application of longitudinal cyclic pitch to be longitudinally forward of axis 24, while the thrust axis of rotor 22 is tilted longitudinally rearward of axis 26 and pods 34 and 36 are power tilted in the corresponding opposite directions. For a leftward yaw motion, lateral cyclic pitch is applied in the opposite directions to tilt the thrust vectors of rotors 22 and 20 in the opposite direction and pods 34 and 36 are power tilted in the opposite directions.

To produce yaw control for aircraft 10, the pilot must produce a yaw couple or moment about a vertical axis of rotation of aircraft 10, such as axis 19 of FIG. 2. As previously described, this yaw control is accomplished in this invention by both introducing differential longitudinal cyclic pitch to our rotors 20 and 22 and by oppositely tilting pods 34 and 36 so as to produce the necessary opposed horizontal components of the thrust vectors to accomplish the desired yaw moment. Our use of cyclic pitch and pod tilting in combination is done in such a way as illustrated in FIG. 6 so as to obtain the advantages of both of these systems while avoiding the disadvantages of each system.

Figure 6:
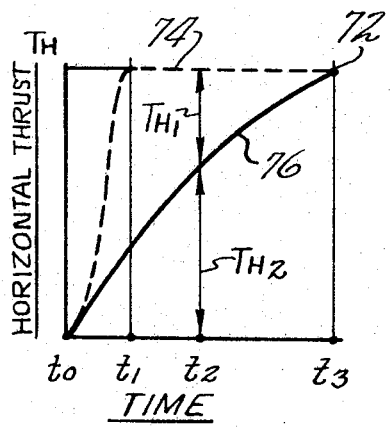
FIG. 6 is a graphic illustration showing a time plot of the horizontal thrust vector required for yaw control and showing the horizontal thrust vector for the FIG. 3, 4 and 5 conditions.

Viewing FIG. 6 we see a graph in which the horizontal component $T_H$ of a rotor thrust vector is plotted against a time ordinate. Pursuant to military specifications and commercial requirements, a particular magnitude of horizontal thrust $T_H$ must be generated within a prescribed period of time $t_1$. The broken line 74 on the graph illustrates the horizontal thrust vector versus time that is achieved by introduction of differential longitudinal cyclic pitch to rotors 20 and 22 while solid line 76 illustrates the horizontal thrust vector $T_H$ that is achieved by tilting pods 34 and 36 longitudinally in opposite directions.

In FIG. 6 $t_0$ represents the time immediately prior to a yaw input and is illustrated as the initial condition in FIG. 3. Time $t_1$ is the time required for differential longitudinal cyclic pitch variation to cause the rotor to produce the level of horizontal thrust vector required and is in the condition illustrated in phantom of FIG. 4, wherein swash plate 68 has been tilted to effect the desired cyclic pitch but pod 34 has not begun to tilt appreciably. Time $t_2$ represents an intermediate condition wherein horizontal thrust is being accomplished by the combined effort of longitudinal cyclic input and pod tilting and wherein the pod tilting contribution to the total horizontal thrust vector $T_H$ is represented as $T_{H2}$ and the longitudinal cyclic contribution thereto is represented as $T_{H1}$. It will be noted by viewing the graphs of FIG. 6 that as time increases the horizontal thrust component contributed by cyclic pitch is diminished or being "washed out" while that contributed by pod tilting is increasing to compensate therefore until, when we eventually arrive at desired point 72 at time $t_3$, all of the horizontal thrust component is contributed by the pod tilting effect and the effect of the cyclic pitch has been completely washed out. Accordingly, by viewing FIG. 6 it will be noted that in the early stages of yaw control almost the complete horizontal thrust vector $T_H$ is contributed by differential longitudinal cyclic pitch between rotors 20 and 22, however, with the passing of time the contribution of pod tilting increases and serves to wash out the contribution of the cyclic pitch variation so that eventually at point 72 at time $t_3$ all yaw control is being accomplished by the pod tilting effect.

Figure 4:
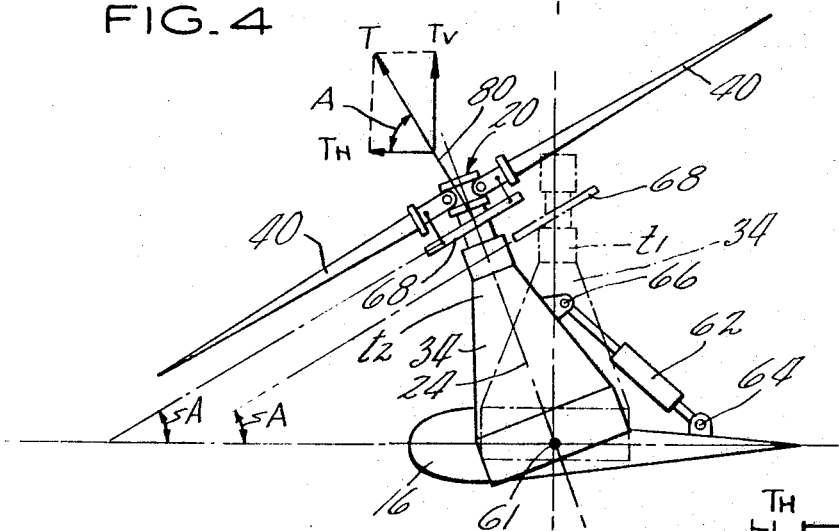
FIG. 4 is comparable to FIG. 3 except that a yaw input has occurred and this is illustrated in the phantom view in the form of a swash plate tilt to create cyclic pitch variation of the blades and in the solid line view to show the same swash plate tilt but with reduced cyclic pitch due to power pod tilting.
Figure 5:
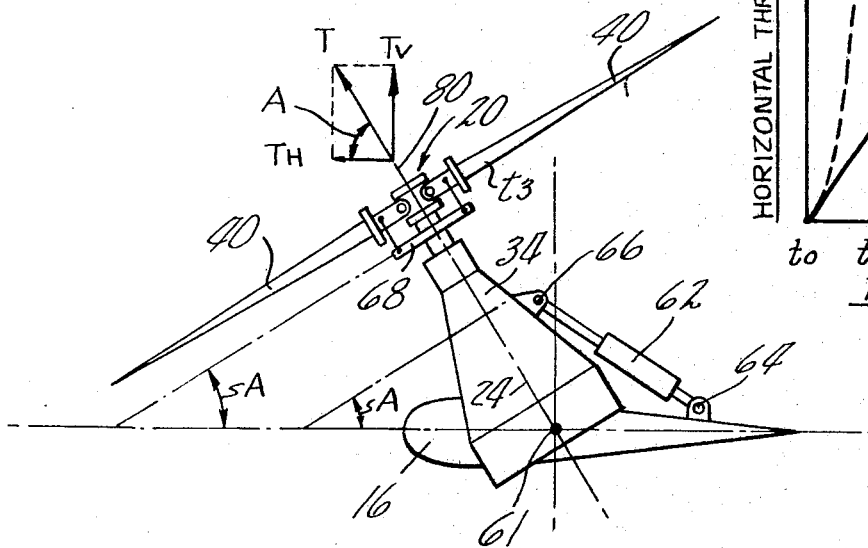
FIG. 5 is comparable to FIGS. 3 and 4 but illustrates the pod in its fully tilted position wherein the tilting of the pod has fully washed out the cyclic pitch input to the rotor.

FIGS. 3, 4 and 5 illustrate one of our two tiltable pods 34 in a steady state helicopter mode condition and in conditions responsive to yaw control, but it should be borne in mind that the other tiltable pod 36 illustrated in FIGS. 1 and 2 is similar thereto and is being similarly actuated but in an opposite direction for yaw control. As best shown in FIG. 3, rotor 20 is supported from tiltable pod 34 for rotation about axis of rotation 24. Pod 34 is mounted for tilting about tilt axis 61 at the tip of wing 16 by tilt pod power actuator 62, which will be described in greater particularity hereinafter. Actuator 62 is pivotally attached to wing 16 or some other portion of fuselage 12 at pivot point 64 and is pivotally attached at its opposite end to pod 34 at pivot point 66. In the FIG. 3 condition, there is no input to swash plate 68 of rotor 20, which swash plate is connected to rotor blades 40 through conventional linkage 70 to vary the pitch thereof both collectively and cyclically as swash plate 68 is caused to either translate along axis 24 or tilt with respect thereto, respectively. In addition, since there is no yaw input in the FIG. 3 condition, there is no actuation of pod tilt actuator 62 and, therefore, rotor 20 is being supported by pod 34 for rotation about its vertically extending axis of rotation 24 wherein rotor 20 is developing vertical thrust $T_V$ only, as illustrated.

When yaw response is desired in aircraft 10, the pilot simultaneously causes longitudinal differential cyclic pitch between the rotors 20 and 22 and causes the pods 34 and 36 to be power tilted in opposite directions. As shown in phantom in FIG. 4, the pilot has caused swash plate 68 of pod 34 to tilt to produce the desired longitudinal cyclic pitch so that swash plate 68 forms angle A with respect to a fixed axis such as 15 on the aircraft 10. The phantom showing in FIG. 4 corresponds to point $t_1$ in FIG. 6 and because very small and insignificant amounts of pod tilting have occurred, almost the entire horizontal thrust vector $T_H$ component is being generated by cyclic pitch inputs. FIG. 4 illustrates in solid line the interim condition at time $t_2$ wherein the pods 34 and 36 have been power tilted substantially and have begun to wash out the differential longitudinal cyclic pitch but have not accomplished this function fully. As shown in solid lines in FIG. 4, axis 80, which is perpendicular to swash plate 68 and the tip path plane of blades 40, defines a slight angle with axis 24 so that we still have cyclic pitch input to blades 40. It should be noted that the angle A of the swash plate remains unchanged while the degree of tilting of pod 34 increases. It should be noted as illustrated in the thrust vector diagram associated with the solid portion of FIG. 4 that the total thrust vector T of rotor 20 comprises a vertical thrust component $T_V$ and a horizontal thrust component $T_H$, which thrust $T_H$ represents the total thrust generated as a result of both cyclic pitch variation and pod tilting.

FIG. 5. illustrates the time $t_3$ condition of the graph of FIG. 6 wherein pod 34 has been tilted sufficiently to completely wash out the cyclic pitch input of swash plate 68 and thereby make axes 80 and 24 coincide. It will be noted in viewing the thrust vector diagram of FIG. 5 that it is precisely the same as the thrust vector diagram of FIG. 4 but that, as illustrated in FIG. 6, the complete horizontal thrust vector for yaw control is now being contributed by pod tilting, the swash plate input of cyclic pitch having been completely washed out.

In this fashion it will be noted that we have accomplished yaw control in the helicopter mode of operation by simultaneously introducing differential longitudinal cyclic pitch to our wing tip rotors 20 and 22 and causing the rotor support pods 34 and 36 to tilt longitudinally in opposite directions, and we have caused the cyclic pitch to be washed out in response to an increase in pod tilting so as to eventually become completely washed out and permit pod tilting to produce all yaw control.

CONTROL SYSTEM—GENERAL

FIG. 7 illustrates our flight control system 85 which includes three control channels, a pitch channel 250, a roll channel 113 and a yaw channel 252 to provide control capability about their respective axes. A fourth channel 84, collective, provides thrust variation capability as well. Pitch control is effected by tilting the swash plates 68 of both rotors longitudinally in the same direction and simultaneously rotating the elevators 56 in the same direction. Roll control is effected by tilting the swach plates 68 of both rotors laterally in the same direction and, simultaneously, rotating the ailerons 58, 60 in opposite directions. Yaw control is effected by tilting the swash plates 68 of both rotors longitudinally in opposite directions then replacing that motion with pod tilting and, simultaneously, rotating the rudder 50. Finally, collective control is effected by translating the swash plates 68 of both rotors in the same direction along their axes of rotation. The specific manner in which these channels operate in addition to the coupling which occurs therebetween is described in greater particularity hereinafter.

It will be apparent from the following description that the helicopter control mechanism is inoperative during the propeller and jet-mode of operation. On the other hand, it should be noted that elevators 56, ailerons 58 and 60, and rudder 50 constitute the sole aerodynamic control surfaces of our control system and, while these members are ineffective during the helicopter hover mode, these members do remain operable and coact with the helicopter control mechanism throughout the helicopter mode of operation.

AERODYNAMIC CONTROL SURFACES

The operation of rudder 50 and the left and right elevators is illustrated in FIG. 15 wherein rudder 50 is pivotally attached to rotatably mounted shaft 51, which is supported from vertical tail section 48 of the fuselage 12 of aircraft 10. Crank member 53 is integrally attached to rotatable shaft 51 and is pivotally attached to rudder actuator shaft 208 at pivot point 55. With this connection it will be seen that as rudder control shaft 208 is caused to reciprocate it causes crank 53 and hence shaft 51 and rudder 50 to pivot about axis 57. Still viewing FIG. 15, it should be borne in mind that left elevator 56 and the right elevator which is hidden by tail section 48 are mounted to be movable with pivotally mounted shaft 59. Shaft 59 has crank 61 integrally attached thereto and projecting therefrom for rotation therewith. Crank 61 is pivotally connected at pivot point 63 to elevator actuator shaft 188 so that reciprocation of the elevator shaft 188 causes shaft 59 and hence both left and right elevators 56, to tilt upwardly or downwardly with respect to horizontal tail sections 52 and 54.

As best shown in FIG. 8, aileron 60 is actuated by rotating aileron actuating shafts 134 and 136 which are best shown in FIG. 7. It will be noted from FIG. 8 that aileron 60 is pivotally attached to rotatable aileron actuator shaft 136 so as to pivot therewith about axis 65 so as to pivot either upwardly or downwardly with respect to fixed wing 16. It should be borne in mind that aileron 58 is positioned for movement with respect to fixed wing 14 in the same fashion as that illustrated and described for aileron 60.

Having described the operation and function of the aerodynamic control surfaces which are primarily effective during the propeller and jet-modes of operation the individual control channels will now be described in detail with the emphasis on the helicopter mode of operation.

COLLECTIVE PITCH CHANNEL

Referring to FIGS. 7 and 10, collective channel 84 consists of collective stick 80 and rod-bellcrank chain 86–104 which operate on commands from the pilot and produce signals which pass through mixing units 106 and 108 and ultimately translate the swash plates 68 of rotors 20 and 22. Collective stick 80 is pivotable about fixed shaft 82; bellcranks 88, 92, 100 about fixed axes 110, 112, 116; and bellcrank 96 about axis 114 movable in a manner to be described hereinafter. Mixing units 104 and 106 are of conventional design and may be of the general type shown more fully in U. S. Pat. No. 3,256,780.

Assuming that it is desirable to increase collective pitch or the total thrust of rotors 20 and 22, the pilot pulls collective stick 80 back whereupon rod-bellcrank chain 86–104 delivers oppositely directed commands to mixing units 104 and 106 for eventual transmittal to rotors 20 and 22. In a similar manner pushing the collective stick 80 forward effects a reduction in collective pitch.

PITCH CHANNEL

Referring to FIGS. 7, 11 and 15, pitch channel 250 consists of cyclic stick 110 and rod-bellcrank chain 174–232 which operate on commands from the pilot and produce signals which pass through mixing units 104 and 106 and ultimately tilt the swash plates 68 of both rotors 20 and 22 longitudinally in the same direction, and also rotate both elevators 56 in the same direction. Cyclic stick 110 and crank 174 are pinned on rotatable shaft 170 and bellcranks 178, 182, 226, and 228 are pivotable about pivots 190, 192, 244 and 242, respectively. Rod-bellcrank chain 174–184 is connected through intermediate shaft 186 to link members 202 and 204 whose lower ends are attached to link members 198 and 200 at pivots 372 and 374, both of which incorporate vertical slope as shown. It is noted that as long as pedals 194 and 196 are not moved, link members 198 and 200 remain locked in place, the result of which is that link members 202 and 204 rotate in unison and impart identical motion to rods 206 and 208 hinged thereto. Pitch channel 250 also incorporates a pair of gain changers 214 and 216. Gain changer 214 attaches to rod 206 at pivot 234 and to rod 222 at pivot 235, and pivotable about pivot 218. Similarly, gain changer 216 attaches to rod 208 at pivot 236 and to rod 224 at pivot 237, and is itself pivotable about pivot 220.

Assuming that it is desired to execute a pitch down or nose down maneuver, the pilot pushes cyclic stick 110 forward whereupon rod-bellcrank chain 174–232 delivers similarly directed linear motion signals to mixing units 104 and 106 for eventual transmission to rotors 20 and 22 and also a linear motion signal to elevators 56. In a similar manner, moving cyclic stick 110 to the rear executes a pitch up or nose up maneuver.

ROLL CHANNEL

Referring to FIGS. 7, 8 and 12, roll channel 113 consists of cyclic stick 110 and a rod-bellcrank chain 118–154 which operate on commands from the pilot and produce signals which pass through mixing units 106 and 108 and ultimately tilt the swash plates 68 of rotors 20 and 22 laterally in the same direction, and also rotate both ailerons 58 and 60 in opposite directions. Cyclic stick 110 is pinned but free to move laterally on rotatable shaft 170 and bellcranks 120, 124, 128, 150 and 133 are pivotable about pivots 138, 140, 142, 160 and 144, respectively. Roll channel 113 includes a gain changer 146 pivotably attached to rods 130 and 132 at pivot 162 and to rod 148 at pivot 164. In addition, gain changer 146 is itself pivotable about pivot 166 movable in a manner described hereinafter.

Assuming that it is desirable to execute a roll right maneuver, the pilot moves cyclic stick 110 to the right whereupon rod-bellcrank chain 118–154 delivers oppositely directed linear motion signals to mixing units 104 and 106 for eventual transmission to rotors 20 and 22 and also oppositely directed rotary motion signals to ailerons 58, 60. In a similar manner, moving cyclic stick 110 to the left executes a roll left maneuver.

YAW CHANNEL

Referring to FIGS. 7, 13 and 15, yaw channel 252 consists of foot pedals 194 and 196 and an associated linkage which operate on commands from the pilot and produce signals which pass through mixing units 106 and 108 and ultimately tilt the swash plates 68 of rotors 20 and 22 longitudinally in different directions, gradually replace that tilting with pod tilting, and in addition provide for rotation of the rudder 50.

Assuming that it is desired to execute a yaw right maneuver, the pilot pushes the right foot pedal 194 whose motion is transmitted through bellcrank 272, rod 270, bellcrank 274, and rod 280 to rudder 50. The rearward motion of rod 280 also initiates swash plate tilting by the coaction of beam 282 and rigid member 292. Moving rearwardly rod 280 rotates beam 282 about pivot 284 and through members 286 and 288 causes link member 198 to rotate forward or counterclockwise; similarly, rigid member 292 travels with rod 280 and rotates link member 200 rearwardly or clockwise. Whereas during a pitching maneuver it was seen that link members 202 and 204 rotated in unison in order to produce like signals in both swash plates 68, it will now be seen that the opposite rotation of link members 198 and 200, which accompanies the introduction of a yaw command, causes opposite signals to be passed on to the swash plates 68 of rotors 20 and 22.

To recognize the manner in which pod tilting is introduced to replace swash plate tilting assume that mode selector stick 380 remains fixed. Bearing in mind that a yaw right maneuver is desired, the rearward motion of rod 280 simultaneously rotates beams 382 and 390 about pivot shafts 384 and 388 through the action of rigid members 430 and 432, respectively. As shown, beam 382 acts through rod-bellcrank chain 400–420, and beam 390 through rod-bellcrank chain 398–408 to deliver signals to their respective pod actuators 460. In a similar manner a yaw left maneuver is executed by pushing the left foot pedal 196.

It is noted that the precise manner in which pod tilting for yaw control is compatible with pod tilting for mode selection is described in greater particularity hereinafter. It is further noted that the manner in which pod tilt washes out swash plate tilt during a yaw maneuver is also more fully described hereinafter.

POD TILT FEEDBACK

As mentioned previously, in conjunction with yaw control it is desirable to provide means whereby longitudinal differential cyclic pitch is gradually washed out as differential pod tilting is introduced. In addition, it is desirable to provide means whereby both longitudinal and lateral cyclic pitch control is phased out so that no cyclic pitch control is available in the pure propeller mode. Referring to FIGS. 7, 8, 9 and 14, it will be seen that the incorporation of feedback shaft 300 and gear train 550–551 enables pod tilting to be sensed and employed as feedback and so provide the aforementioned cyclic pitch wash out and phase out features in a manner described more fully hereinafter.

With respect to the cyclic wash out feature, pod tilting operates through gear train 550–551 and causes rotation of feedback shaft 300 in the same direction as shown.

The motion of shaft 300 is transmitted through crank 304 to rod 352 which operates through beam 354 to move rods 356 and 358 equal amounts but in opposite directions. Rods 356 and 358 attach to a pair of pivot bars 364 and 366 at joints 360 and 362, having vertical slop as shown. Pivot bars 364 and 366 are pivotable at their lower ends about shaft 370 and are pivotally attached themselves to the lower ends of links 198 and 200.

For purposes of illustration the cyclic pitch wash out function will be described in greater particularity, referring specifically to FIG. 9 and noting that only that portion of the system relating to the right-hand pod had been shown. Assuming again that it is desired to execute a yaw right maneuver, the pilot pushes foot pedal 194 whereupon rod 280 moves to the rear and by means of beam 282 causes member 288 and pivot 289 to move forward as indicated by the arrows. Subsequently, link 198 rotates counterclockwise to its 198 dashed position, and link 202 clockwise to its 202 dashed position, which motion is accommodated by sloppy joint 372. As a result of this motion, rod 206 translates to the left as indicated and introduces the desired amount of longitudinal cyclic input as described in greater detail under the previous heading "Yaw Channel." It will be recalled that in addition to initiating swash plate tilting, the motion of rod 280 also initiates pod tilting through beam 382 and rod 400 as indicated.

To accomplish cyclic pitch wash out as pod tilting progresses in the manner desired, pod motion is then transmitted as feedback ultimately through rod 356 as described above. In the case of a yaw right maneuver the right hand pod 36 tilts forward resulting in movement of rod 356 to the left as indicated by the arrow. As a result, pivot bar 364 rotates counterclockwise to its 364 dashed line position. Since pivot point 289 is now fixed, the effect of this motion is to rotate link 198 to its 198 dashed line position, and link 202 to its original vertical position thereby introducing a longitudinal cyclic pitch input in a direction opposite that of the original input. Upon completion of the yaw maneuver the pilot recenters foot pedals 194 and 196 thereby returning the system to its original position.

At this point it is convenient to point out that the position of mode selector stick 380 establishes the position of shaft 370 and therefore establishes a reference dependent on the initial position of pods 34 and 36. Such an arrangement affords the capability of yaw control without changing the steady state positions of pods 34 and 36 which conceivably could be in a position somewhere between the vertical helicopter and horizontal propeller positions.

With respect to the cyclic phaseout feature, the rotation of feedback shaft 300 is also transmitted by cranks 302, 304 and 306 through rods 308, 310 and 312, to beams 314, 316 and 318. Beams 314, 316 and 318 are pivotable about pivots 320, 322 and 324, respectively and cause rods 326, 328 and 330 along with their associated pivots 218, 220 and 166 to translate downward in response to any tilting of pods 34 and 36. It will be seen that as pivots 218, 220 and 166 reach their lowermost position, gain in both the longitudinal and lateral cyclic pitch channels drops to zero and effects the desired cyclic phaseout. Note, however, that such cyclic phaseout does not interfere in any way with the operation of the pitch channel elevators, roll channel ailerons, or yaw channel rudder which remain operative at all times.

It will be evident to those skilled in the art that the slots of gain changers could be contoured to produce the best aircraft control. For example, it might be desirable to maintain full cyclic authority for the first 10° of pod tilt and zero cyclic authority for the last 10° of pod tilt.

MODE SELECTION

Referring to FIGS. 7 and 13 this control system incorporates means whereby mode selection is made possible by tilting both pods in the same direction in a manner compatible with the tilting required for a yaw maneuver as described previously. Basically, this means consists of a mode selector stick 380, a pair of rotatable beams 382 and 390, and rod-bellcrank chains 400–420 and 398–408 which coact to deliver pilot commands to each pod actuator 460 in the manner desired.

Assuming that it is desired to convert from the FIG. 1 helicopter mode to the FIG. 2 propeller mode, the pilot keeps footpedals 194 and 196 fixed and pushes mode selection stick 380 forward, whereupon rod 382 moves rearwardly rotating beams 382 and 390 counterclockwise through rigid members 284 and 388. As a result, rod-bellcrank chains 400–420 and 398–408 deliver signals in the same direction to their respective pod actuators 460. In a similar manner, pulling mode selector stick 380 back initiates conversion from the propeller mode to the helicopter mode or any position therebetween. The manner in which pod actuation is accomplished for yaw maneuvers is described previously.

COLLECTIVE PITCH COMPENSATION

For all pod tilting, we encounter a tilting of the rotor thrust vector T, thereby reducing the rotor vertical thrust vector $T_V$. To compensate for this reduction in vertical thrust vector and thereby prevent the aircraft 10 from losing altitude, collective pitch compensation is provided for. This collective pitch compensation is accomplished by placing gain changer 450 in the system. Gain changer 450 is pivotally connected to rudder actuator link 280 at pivot point 452 and is itself supported for pivoting about movable pivot 454. Road 456 projects from and is carried by member 450 and is in turn pivotally attached to rod 458, which connects to bellcrank 460, which in turn connects pivotally to rod 462. Rod 462 is pivotally connected at pivot point 114 to beam member 96 of the collective channel 84. In view of this connection, as input takes place to the rudder through rod 280 in yaw control, gain changer 450 is caused to rotate about pivot shaft 454 so as to move link 456 in a clockwise direction and the vertical component of that motion is transmitted to the collective control system 84 through link-bellcrank chain 458–462 so as to add collective pitch in response to this pod tilting signal. Bellcrank 460 is pivotally connected to pivot about pivot point 464. In this fashion, collective pitch increases to compensate for reduced vertical thrust vector caused by pod tilting.

In the FIG. 2 propeller mode of operation, this collective blade pitch-pod tilt integration is not desired and therefore crank member 451 is connected to pod tilt feedback rod 300 to pivot therewith, and is in turn pivotally connected to rod-crank chain 453–455–457 so as to cause pivot 454 of gain changer 450 to proceed to the bottom of its cam slot in response to pod tilting to be in alignment with shaft 456, thereby eliminating the vertical motion component into rod-bellcrank chain 458–460–462 in response to the pivoting gain changer 450. With pivot 454 in its bottom position, which occurs when pods 34 and 36 are in their FIG. 2 propeller mode of operation, it will be noted that the pilot has full control of rudder 50 through foot pedals 194 and 196 and that the motion of rudder actuating rod 280 is not integrated through rod-bellcrank chain 458–462 to the collective pitch channel 84. Similarly, it will be noted that as the pods 34 and 36 tilt to intermediate positions between the FIG. 1 helicopter position and the FIG. 2 propeller position, pin 454 of gain changer 450 moves to an intermediate position within its cam slot so as to produce a decreased collective pitch input in response to pod tilting at these intermediate positions.

COLLECTIVE PITCH BIASING DURING POD TILTING

Now viewing FIG. 8 we see left-hand tiltable pod 34 mounted at the tip of wing 16 for tilting motion about axis 61 and carrying swash plate 68 of rotor 20. To cause the tilting of pod 34 about axis 61, pod tilt rod 408 imparts linear motion to pivotally connected bellcrank 460 and link 462 to control the servo valve 463 which is hydraulically connected in conventional fashion to hydraulic piston-cylinder tilt pod actuator 62 so as to either lengthen or reduce the length actuator 62 or the distances between pivot points 64 and 66. When the distance between these pivot points is increased, pod 34 pivots longitudinally forwardly about axis 61 and when the distance between these two pivot points is reduced, pod 34 tilts longitudinally rearwardly about axis 61.

Gear 550 is connected to pod 34 in conventional fashion so as to be rotated in response to pod tilting in either direction and is connected through conventional idler gear 551 to pod tilt feedback rod 300 to cause it to rotate and introduce the various feedback functions previously described in connection with FIGS. 7 and 9.

Three output shafts 470, 472 and 474, which carry integrated pitch roll and yaw signals from mixer 106, are connected to three equally spaced circumferential positions on swash plate 68 to either cause it to translate along axis 24 for collective pitch variations or to tilt with respect to axis 24 for cyclic pitch variations.

The motion of rod 470 is transmitted to point 486 of swash plate 68 by the coaction of cammed sleeve assembly 600, crank 480, rod 484, and a rod-bellcrank assembly (not shown). In a similar manner, the motion of rod 472 is transmitted to point 498 by the coaction of cammed sleeve assembly 602, crank 488, rod 492, bellcrank 494, and rod 496. Finally, the motion of rod 474 is transmitted to point 514 by the coaction of cammed sleeve assembly 604, crank 500, rod 504, bellcrank 506, rod 508, beam 510 and rod 512. As shown, cammed sleeve assemblies 600, 602, and 604 are identical; for purposes of illustration only cammed sleeve assembly 600 will be described in detail. Cammed sleeve assembly 600 comprises an inner sleeve portion 601 rigidly attached to crank 480 and having a projection 603 thereon which engages a slot 605 in an outer sleeve portion 607 rigidly attached to the crank end of rod 470. Both inner sleeve 601 and outer sleeve 607 are slidable along axis 61. Such an arrangement not only eliminates inadvertent pod tilt-pitch change coupling, but makes it possible to introduce a collective pitch bias as conversion is made from the helicopter mode to the propeller mode. By a collective bias is meant that the level of collective pitch is shifted as a function of pod tilt without affecting the range of collective pitch control, higher values of collective pitch being required in the propeller mode. As the pods 34 and 36 are tilted from the helicopter mode of FIG. 1 to the propeller mode of FIG. 2, the rotor blades 40 experience an increase in local angle of attack due to the vector addition of a component of forward velocity and velocity due to rotor rotation. Due to this increase in angle of attack, the pilot would normally be required to increase collective pitch as he transitioned to the helicopter mode. The invention described herein accomplishes the required pitch increase automatically and is described in the following paragraph. Accordingly it will be seen that as pod 34 tilts from its helicopter mode vertical position to its propeller mode horizontal position, the coaction of each projection 603 and slot 605 causes each inner sleeve 601 to translate with respect to each outer sleeve 607 and thereby effect an increase in collective pitch without any adjustment of the controls by the pilot. It is noted that the upper portion of slot 605 exends longiudinally in order to accommodate rearward tilting of each pod without introducing any biasing effect. Thus, in summary, the use of cammed sleeve assemblies 600, 602 and 604 performs the double function of eliminating pod tilt-pitch change coupling and introducing collective pitch biasing.

It is to be understood that the invention is not limited to the specific embodiment herein illustrated and described but may be used in other ways.

I claim:
1. In an aircraft having:
   (a) a fuselage,
   (b) laterally extending wings on opposite sides of said fuselage,
   (c) a pod mounted at the tip of each wing to be tiltable between a vertical position and positions on opposite sides thereof,
   (d) a multi-bladed rotor extending from each of said pods and mounted for rotation so that with said pods in said vertical position, said aircraft is in the helicopter mode of operation, and wherein the blades of said rotors are mounted for collective and cyclic pitch variation,
   (e) helicopter mode yaw control means including,
      (1) first means to cause said pods to tilt with respect to said vertical position,
      (2) second means to cause said rotor blades of each of said rotors to vary pitch cyclically to produce differential longitudinal cyclic pitch between said rotors,
      (3) and third means actuatable to cause said first means to cause said pods to begin to tilt in opposite directions with respect to their vertical positions and to actuate said second means to cause said helicopter rotors to change cyclic pitch to product differential longitudinal cyclic pitch therebetween and which third means causes said second to gradually wash out as said first means causes the tilt of the pods to increase.

2. Apparatus according to claim 1 wherein each of said rotors includes:
   (a) a central hub,
   (b) a plurality of blades projecting radially from and supported by said hub for rotation therewith about an axis of rotation and for both collective pitch change and cyclic pitch change with respect thereto and wherein both said first means and said second means cause the thrust vector of said rotors to tilt from their vertical positions and further including means to automatically increase the collective pitch of the blades as the thrust vectors of said rotors are caused to tilt.

3. In an aircraft having:
   (a) a fuselage,
   (b) laterally extending wings on opposite sides of said fuselage,
   (c) a pod mounted at the tip of each wing to be tiltable between a vertical position and positions on opposite sides thereof,
   (d) a multi-bladed rotor extending from each of said pods and mounted for rotation so that with said pods in said vertical position, said aircraft is in the helicopter mode of operation, wherein the blades of said rotors are mounted for collective and cyclic pitch variation,
   (e) helicopter mode yaw control means including,
      (1) first means to cause said pods to tilt with respect to said vertical position,
      (2) second means to cause said rotor blades of each of said rotors to a vary pitch cyclically to produce differential longitudinal cyclic pitch between said rotors,
      (3) and third means to wash out said differential longitudinal cyclic pitch between said rotors in response to pod tilting.

4. In an aircraft having:
   (a) a fuselage,
   (b) laterally extending wings projecting in opposite sides of said fuselage,
   (c) a pod mounted at the tip of each wing to be tiltable between a vertical position and positions on opposite longitudinal sides thereof,
   (d) a multi-bladed rotor extending from each of said pods and mounted for rotation so that with said pod in the vertical position, said aircraft is in the helicopter mode of operation, and with the rotor blades mounted for cyclic pitch variation,
   (e) yaw control means to cause said pods to tilt longitudinally in opposite directions from their vertical positions and to cause the pitch of said rotors to change cyclically to produce differential longitudinal cyclic pitch therebetween and to cause said differential longitudinal cyclic pitch to wash out as the amount of pod tilting increases.

5. In an aircraft having:
   (a) a fuselage,
   (b) laterally extended wings on opposite sides of said fuselage,
   (c) a pod mounted at the tip of each wing to be tiltable between a vertical position for helicopter mode of operation and a horizontal position for propeller mode of operation,
   (d) a multi-bladed rotor extending from each of said pods and mounted for rotation about an axis of rotation,
   (e) means to cause the pitch of said blades to vary both collectively and cyclically,
   (f) means to tilt said pods between said vertical and horizontal positions,
   (g) means to increase the collective pitch level of said rotor blades as said pods move from said vertical positions to said horizontal positions and to decrease the collective pitch as said pods move from said horizontal positions to said vertical positions, while maintaining the same range of collective pitch variations throughout,
   (h) yaw control means to cause said pods to tilt longitudinally in opposite directions from their vertical positions and to cause the pitch of said rotors to change cyclically to produce differential longitudinal cyclic pitch therebetween and to cause said differential longitudinal cyclic pitch to wash out as the amount of pod tilting increases.

6. In an aircraft having:
   (a) a fuselage,
   (b) laterally extending wings on opposite sides of said fuselage,
   (c) a pod mounted at the tip of each wing to be tiltable between a vertical position and positions on opposite sides thereof,
   (d) a multi-bladed rotor extending from each of said pods and mounted for rotation so that with said pods in said vertical position, said aircraft is in the helicopter mode of operation, and wherein the blades of said rotors are mounted for collective and cyclic pitch variation,
   (e) first means to cause said pods to tilt with respect to said vertical position,
   (f) second means to cause said rotor blades of each of said rotors to vary pitch cyclically to produce differential longitudinal cyclic pitch between said rotors,
   (g) third means actuatable to cause said first means to cause said pods to begin to tilt in opposite directions with respect to their vertical positions and to actuate said second means to cause said helicopter rotors to change cyclic pitch to produce differential longitudinal cyclic pitch therebetween and which third means causes said second means to gradually wash out as said first means causes the tilt of the pods to increase,
   (h) means to tilt said pods between vertical and horizontal positions with respect to said fuselage,
   (i) and means to automatically increase the collective pitch level of the blades of each rotor as said pods tilt from said vertical to said horizontal positions and to decrease the collective pitch level of said blades as said pods tilt from said horizontal to said vertical positions while maintaining the same collective pitch range throughout.

7. In an aircraft having:
(a) a fuselage,
(b) laterally extending wings on opposite sides of said fuselage,
(c) a pod mounted at the tip of each wing to be tiltable between a vertical position and positions on opposite sides thereof,
(d) a multi-bladed rotor extending from each of said pods and mounted for rotation so that with said pods in said vertical position, said aircraft is in the helicopter mode of operation, and wherein the blades of said rotors are mounted for collective and cyclic pitch variation,
(e) first means to cause said pods to tilt with respect to said vertical position,
(f) second means to cause said rotor blades of each of said rotors to vary pitch cyclically to produce differential longitudinal cyclic pitch between said rotors,
(g) third means actuatable to cause said first means to cause said pods to begin to tilt in opposite directions with respect to their vertical positions and to actuate said second means to cause said helicopter rotors to change cyclic pitch to produce differential longitudinal cyclic pitch therebetween and which third means causes said second means to gradually wash out as said first means causes the tilt of the pods to increase,
(h) means to automatically increase the collective pitch of the blades of said rotors in response to an increase in the differential longitudinal cyclic pitch between the rotors.

8. In an aircraft having:
(a) a fuselage,
(b) laterally extending wings on opposite sides of said fuselage,
(c) a pod mounted at the tip of each wing to be tiltable between a vertical position and positions on opposite sides thereof,
(d) a multi-bladed rotor extending from each of said pods and mounted for rotation so that with said pods in said vertical position, said aircraft is in the helicopter mode of operation, and wherein the blades of said rotors are mounted for collective and cyclic pitch variation,
(e) first means to cause said pods to tilt with respect to said vertical position,
(f) second means to cause said rotor blades of each of said rotors to vary in pitch cyclically to produce differential longitudinal cyclic pitch between said rotors,
(g) third means actuatable to cause said first means to cause said pods to begin to tilt in opposite directions with respect to their vertical positions and to actuate said second means to cause said helicopter rotors to change cyclic pitch to produce differential longitudinal cyclic pitch therebetween and which third means causes said second means to gradually wash out as said first means causes the tilt of the pods to increase,
(h) and means to automatically increase the collective pitch of the blades of said rotors in response to an increase in differential longitudinal tilt of said pods.

9. In an aircraft having:
(a) a fuselage,
(b) laterally extending wings projecting in opposite sides of said fuselage,
(c) a pod mounted at the tip of each wing to be tiltable between a vertical position and positions on opposite longitudinal sides thereof,
(d) a multi-bladed rotor extending from each of said pods and mounted for rotation so that with said pod in the vertical position, said aircraft is in the helicopter mode of operation, and with the rotor blades mounted for cyclic pitch variation,
(e) yaw control means to cause said pods to tilt longitudinally in opposite directions from their vertical positions and to cause the pitch of said rotors to change cyclically to produce differential longitudinal cyclic pitch therebetween and to cause said differential longitudinal cyclic pitch to wash out as the amount of pod tilting increases,
(f) means to cause said cyclic pitch variation means to become ineffective as said pod tilts from said vertical to said horizontal position.

10. An aircraft having:
(a) a fuselage with a longitudinal axis and a lateral axis,
(b) fixed left and right wings projecting laterally on opposite sides of said fuselage,
(c) pods mounted at the tips of said wings to be tiltable about a pod tilt axis between vertical positions and horizontal positions,
(d) a multi-bladed rotor projecting from and supported for rotation with respect to each of said pods so that said aircraft is operating in the helicopter mode when said pods are in said vertical positions and so that said aircraft is operating in the propeller mode when said pods are in said horizontal positions,
(e) means to vary the pitch of the blades of said rotors cyclically,
(f) a tail section projecting from said fuselage and including:
  (1) vertical stabilizer,
  (2) a horizontal stabilizer,
  (3) a rudder extending along said vertical stabilizer and pivotally connected thereto for lateral left and right pivot motion with respect thereto,
  (4) an elevator extending along and pivotally connected to said horizontal stabilizer for pivot motion with respect thereto about an axis substantially parallel to said aircraft lateral axis,
(g) an aileron extending along the after-end of each of said wings and pivotally connected thereto for pivot motion about an axis substantially parallel to said aircraft lateral axis,
(h) a flight control system including:
  (1) a pitch channel having:
    (A) means to apply longitudinal cyclic pitch to the blades of each of said rotors in the same direction and,
    (B) means to pivot said elevators,
  (2) a roll channel having:
    (A) means to apply lateral cyclic pitch to the blades of each of said rotors in the same direction and,
    (B) means to pivot said ailerons,
  (3) a yaw channel having:
    (A) means to apply differential longitudinal cyclic pitch to said rotors and,
    (B) means to apply opposite longitudinal tilting to said pods and,
    (C) means to wash out said differential longitudinal cyclic pitch in response to an increase in said opposite longitudinal tilting of said pods,
    (D) means to pivot said rudder.

11. Apparatus according to claim 10 wherein said pitch channel includes means to cause said elevators to pivot and to apply longitudinal cyclic pitch to said rotors in the same direction simultaneously, wherein said roll channel includes means to pivot said ailerons and to apply lateral cyclic pitch to said rotors in the same direction simultaneously, and wherein said yaw channel includes means to pivot said rudder and to apply differential longitudinal cyclic pitch to said rotors and to tilt said pods longitudinally in opposite directions simultaneously.

12. Apparatus according to claim 11 wherein said pitch channel includes means to produce a pitch down motion by simultaneously pivoting said elevators downwardly and simultaneously applying longitudinally forward cyclic pitch to both of said rotors and to produce pitch up motion by pivoting said elevators upwardly and applying longitudinally rearward cyclic pitch to both of said rotors, and wherein said roll channel includes means to produce roll right motion by simultaneously causing the right wing aileron to pivot upwardly and the left wing aileron to pivot downwardly and also simultaneously causing both rotors to vary cyclic pitch laterally to the right and to produce roll left motion by causing the left wing aileron to pivot upwardly and the right wing aileron to pivot downwardly and both rotors to vary pitch cyclically laterally to the left, and wherein said yaw channel includes means to produce right yaw motion by simultaneously causing said rudder to pivot to the right, the right rotor to vary cyclic pitch longitudinally rearwardly and the left rotor to vary cyclic pitch longitudinally forwardly and to produce left yaw motion by simultaneously causing said rudder to pivot to the left, the left rotor to vary pitch cyclically longitudinally rearwardly, and the right rotor to vary pitch cyclically longitudinally forward.

13. An aircraft having:
(a) a fuselage with a longitudinal axis and a lateral axis,
(b) fixed left and right wings projecting laterally on opposite sides of said fuselage,
(c) pods mounted at the tips of said wings to be tiltable about a pod tilt axis between vertical positions and horizontal positions,
(d) a multi-bladed rotor projecting from and supported for rotation with respect to each of said pods so that said aircraft is operating in the helicopter mode when said pods are in said vertical positions and so that said aircraft is operating in the propeller mode when said pods are in said horizontal positions,
(e) means to vary the pitch of the blades of said rotors cyclically,
(f) a flight control system including:
 (1) a pitch channel having:
  (A) means to apply longitudinal cyclic pitch to the blades of each of said rotors in the same direction,
 (2) a roll channel having:
  (A) means to apply lateral cyclic pitch to the blades of each of said rotors in the same direction and,
 (3) a yaw channel having:
  (A) means to apply differential longitudinal cyclic pitch to said rotors and,
  (B) means to apply opposite longitudinal tilting to said pods, and
  (C) means to wash out said differential longitudinal cyclic pitch as opposite longitudinal tilting of said pods increases.

14. A convertiplane capable of operation in both the helicopter and the propeller modes of operation and having:
(a) a fuselage,
(b) laterally extending wings projecting in opposite sides of said fuselage,
(c) a pod mounted at the tip of each wing to be tiltable between a vertical position and positions on opposite longitudinal sides thereof,
(d) a multi-bladed rotor extending from each of said pods and mounted for rotation so that with said pod in the vertical position, said aircraft is in the helicopter mode of operation, and with the rotor blades mounted for cyclic pitch variation,
(e) an integrated flight control system having:
 (1) a propeller mode pitch control channel, roll control channel and yaw control channel,
 (2) a helicopter mode pitch control channel, roll control channel and yaw control channel, and wherein said yaw control channel includes:
  (A) means to cause said pods to tilt longitudinally in opposite directions from their vertical positions and to cause the pitch of said rotors to change cyclically to produce differential longitudinal cyclic pitch therebetween and to cause said differential longitudinal cyclic pitch to wash out as the amount of pod tilting increases,
 (3) means operable in the helicopter mode of operation to cause both pitch control channels to operate simultaneously, to cause both roll control channels to operate simultaneously, and to cause both yaw control channels to operate simultaneously,
 (4) means operable in the propeller mode of operation to make each of the pitch control, roll control and yaw control channels of the helicopter mode inoperative while retaining the operability of each of the pitch control, roll control and yaw control channels of the fixed-wing mode.

15. In an aircraft having:
(a) a fuselage,
(b) laterally extending wings on opposite sides of said fuselage,
(c) a pod mounted at the tip of each wing to be tiltable between a vertical position and positions on opposite sides thereof,
(d) a multi-bladed rotor extending from each of said pods and mounted for rotation so that with said pods in said vertical posiaion, said aircraft is in the helicopter mode of operation, and wherein the blades of said rotors are mounted for collective and cyclic pitch variation,
(e) first means to cause said pods to tilt with respect to said vertical position,
(f) second means to cause said rotor blades of each of said rotors to vary in pitch cyclically to produce differential longitudinal cyclic pitch between said rotors,
(g) and third means actuatable to cause said first means to cause said pods to begin to tilt in opposite directions with respect to their vertical positions and to actuate said second means to cause said helicopter rotors to change cyclic pitch to produce differential longitudinal cyclic pitch therebetween and which third means causes said second means to gradually wash out as said first means causes the tilt of the pods to increase,
(h) wherein said first means causes said pods to tilt with respect to said vertical position to thereby cause said rotors to produce a horizontal thrust vector and wherein said second means causes said rotor blades of each of said rotors to vary pitch cyclically to produce differential longitudinal cyclic pitch between said rotors to product a horizontal thrust vector from each of said rotors,
(i) and means to actuate said first and second means so that initially substantially the total horizontal thrust vector is generated by said second means, so that said first means gradually produces an increasingly larger horizontal thrust vector while said second means gradually produces an increasingly smaller horizontal vector, and so that eventually the total horizontal thrust vector is produced by said first means.

16. A compound aircraft including:
(a) a fuselage having a longitudinal axis and a lateral axis,
(b) fixed left and right wings projecting laterally on opposite sides of said fuselage,
(c) an aircraft tail section extending from said fuselage and including a vertical stabilizer having:
 (1) a rudder member extending therealong and pivotally connected thereto for pivot motion left and right on opposite sides of said vertical stabilizer,
(d) a pod mounted at the tip of each of said wings and tiltable between a vertical position and a horizontal position and to positions on longitudinally opposite sides of the vertical position,
(e) a multi-bladed rotor extending from and supported by each of said pods for rotation so that said aircraft is in helicopter mode when said pods are in said vertical position and so that said aircraft is in propeller mode when said pods are in said horizontal position, with the blades thereof mounted for collective and cyclic pitch variation,
(f) a flight control system including:
  (1) a collective pitch channel including:
    (A) a pilot operated collective stick,
    (B) means connected to said collective stick and said blades so that movement of said collective stick collectively varies the pitch of said blades,
  (2) a yaw control channel including:
    (A) pilot operated foot pedals,
    (B) means connected to said foot pedals, to said rudder and to said rotors so that in response to foot pedal motion said rudder is caused to pivot left or right with respect to said vertical stabilizer, said rotors are caused to vary pitch cyclically in opposite longitudinal directions to effect differential longitudinal pitch, and said pods are caused to tilt in the same opposite longitudinal directions,
    (C) means to wash out said differential longitudinal cyclic pitch of said rotors in response to pod tilt increase.

17. Apparatus according to claim 16 and including means integrating said yaw and collective pitch channels so that collective pitch of said blades is increased in response to pod tilting and the application of longitudinal cyclic pitch of said rotors.

18. Apparatus according to claim 17 and including means to phase out said yaw-collective pitch channel integration as said pods are tilted from their vertical to their horizontal position.

19. Apparatus according to claim 1 and including means to make ineffective the collective pitch portion of said yaw control channel when said pods are tilted from their vertical to their horizontal position while retaining the rudder responsively connected to said foot pedals.

20. Apparatus according to claim 16 and including means to increase the collective pitch level of said blades as said rotors and pods are tilted from said vertical to said horizontal position.

21. A compound aircraft including:
(a) a fuselage having a longitudinal axis and a lateral axis,
(b) fixed left and right wings projecting laterally on opposite sides of said fuselage and having leading and trailing edges,
(c) an aircraft tail section extending from said fuselage and including a vertical stabilizer and at least one horizontal stabilizer and having:
  (1) a rudder member extending along said vertical stabilizer and pivotally connected thereto for pivot motion left and right on opposite sides of said vertical stabilizer,
  (2) an elevator extending along said horizontal stabilizer and pivotally connected thereto to be pivoted upwardly and downwardly with respect to said elevator,
(d) a pod mounted at the tip of each of said wings and tiltable between a vertical position and a horizontal position and to positions on longitudinally opposite sides of the vertical position,
(e) a multi-bladed rotor extending from and supported by each of said pods for rotation so that said aircraft is in helicopter mode when said pods are in said vertical position and so that said aircraft is in propeller mode when said pods are in said horizontal position, with the blades thereof mounted for collective and cyclic pitch variation,
(f) an aileron pivotally connected to the after-edge of each of said wings,
(g) a flight control system including:
  (1) a collective pitch channel including:
    (A) a pilot operated collective stick,
    (B) a chain of pivotally connected rods and bellcranks connected to said collective stick and said blades so that movement of said collective stick collectively varies the pitch of said blades,
    (C) means to increase the collective pitch input of said pitch change channel when said pods are tilted on either side of their vertical position,
    (D) means to increase the collective pitch level of said blades as said pods are tilted from said vertical to said horizontal position,
  (2) a yaw control channel including:
    (A) pilot operated foot pedals,
    (B) a chain of pivotally connected rods and bellcranks connected to said foot pedals, to said rudder and to said rotors so that in response to foot pedal motion said rudder is caused to pivot left or right with respect to said vertical stabilizer, said rotors are caused to vary pitch cyclically in opposite longitudinal directions to effect differential longitudinal pitch, and said pods are caused to tilt in the same opposite longitudinal directions,
    (C) means to wash out said differential longitudinal cyclic pitch of said rotors in response to pod tilt increase,
  (3) a roll channel comprising:
    (A) a pilot operated cyclic pitch stick,
    (B) a chain of pivotally connected rods and bellcranks connecting said cyclic stick to said ailerons and said blades so that in response to cyclic pitch stick motion said ailerons are caused to pivot in opposite directions and the cyclic pitch of each of said rotors is caused to vary laterally in the same direction to cooperate with the ailerons to effect aircraft roll motion,
    (C) and means to eliminate the cyclic pitch variation portion of said roll channel when said pods are tilted from said vertical to said horizontal positions,
  (4) a pitch channel including:
    (A) a pilot operated cyclic stick,
    (B) a chain of pivotally connected rods and bellcranks connecting said stick to said elevator and to said rotors so that in response to cyclic stick motion said rotors vary pitch cyclically longitudinally in the same direction and said elevator pivots with respect to said horizontal stabilizer to cooperate with said rotors so pitched to effect roll motion of said aircraft,
    (C) means to make ineffective the cyclic pitch control portion of said pitch channel when said pods are tilted from their vertical to their horizontal positions while retaining said elevator in responsive relation to said cyclic pitch stick.

References Cited

UNITED STATES PATENTS

| 2,980,187 | 4/1961 | Smyth-Davila | 170—160.13 X |
| 3,181,810 | 5/1965 | Olson | 244—7 |
| 3,184,181 | 5/1965 | Kaplan | 244—7 |

MILTON BUCHLER, Primary Examiner

J. L. FORMAN, Assistant Examiner

U.S. Cl. X.R.

244—17.19; 170—135.26, 160.13, 160.26

PO-1050
(5/69)

UNITED STATES PATENT OFFICE
CERTIFICATE OF CORRECTION

Patent No. 3,514,052　　　　　　　Dated May 26, 1970

Inventor(s) John C. McKeown

It is certified that error appears in the above-identified patent and that said Letters Patent are hereby corrected as shown below:

In the Claims, page 75, column 19, claim 19, line 1

Delete "1" and insert -- 18 --

SIGNED AND
SEALED

SEP 29 1970

(SEAL)
Attest:

Edward M. Fletcher, Jr.
Attesting Officer

WILLIAM E. SCHUYLER, JR.
Commissioner of Patents